United States Patent
Miyabara et al.

(10) Patent No.: US 9,620,777 B2
(45) Date of Patent: Apr. 11, 2017

(54) POSITIVE ELECTRODE AND LITHIUM ION SECONDARY BATTERY USING THEREOF

(71) Applicant: TDK CORPORATION, Tokyo (JP)

(72) Inventors: Hiroyuki Miyabara, Tokyo (JP); Hiroki Kitamura, Tokyo (JP); Yukiko Hirabayashi, Tokyo (JP); Masaki Sobu, Tokyo (JP); Tetsuo Takaishi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 34 days.

(21) Appl. No.: 14/502,314

(22) Filed: Sep. 30, 2014

(65) Prior Publication Data

US 2015/0093633 A1    Apr. 2, 2015

(30) Foreign Application Priority Data

Sep. 30, 2013 (JP) .............. 2013-203682
Sep. 10, 2014 (JP) .............. 2014-184338

(51) Int. Cl.

| H01M 4/36 | (2006.01) |
|---|---|
| H01M 4/131 | (2010.01) |
| H01M 4/525 | (2010.01) |
| H01M 4/62 | (2006.01) |
| H01M 10/0525 | (2010.01) |

(52) U.S. Cl.
CPC .......... *H01M 4/366* (2013.01); *H01M 4/131* (2013.01); *H01M 4/525* (2013.01); *H01M 4/625* (2013.01); *H01M 10/0525* (2013.01); *Y02E 60/122* (2013.01)

(58) Field of Classification Search
CPC ...... H01M 4/366; H01M 4/625; H01M 4/525; H01M 4/131; H01M 10/0525; Y02E 60/122
See application file for complete search history.

(56) References Cited

U.S. PATENT DOCUMENTS

| 2004/0180263 A1* | 9/2004 | Kase | H01M 4/525 |
| | | | 429/231.3 |
| 2012/0107686 A1* | 5/2012 | Ryu | H01M 4/485 |
| | | | 429/231.5 |
| 2012/0264021 A1* | 10/2012 | Sugiura | H01M 4/13 |
| | | | 429/232 |
| 2015/0111106 A1* | 4/2015 | Son | H01M 4/0471 |
| | | | 429/223 |

FOREIGN PATENT DOCUMENTS

| JP | A-2003-086174 | 3/2003 |
| JP | A-2003-257434 | 9/2003 |
| JP | A-2004-059417 | 2/2004 |

* cited by examiner

*Primary Examiner* — Laura Weiner

(74) *Attorney, Agent, or Firm* — Oliff PLC

(57) ABSTRACT

A lithium ion secondary battery with a high electrode density and an excellent rate discharge characteristic. The positive electrode includes a positive electrode active material of a compound represented by $Li_a(Ni_xCo_yAl_{1-x-y})O_2$ ($0.95 \leq a \leq 1.05$, $0.5 \leq x \leq 0.9$, $0.05 \leq y \leq 0.2$), and carbon adhered to the surface of the material, in the Raman spectrum using a laser of 532 nm, the positive electrode includes a peak $P_A$ (D band) at 1200~1450 $cm^{-1}$, a peak $P_B$ (G band) at 1450~1700 $cm^{-1}$ and a peak $P_C$ at 400~600 $cm^{-1}$, and when the intensities are normalized by regarding the maximum intensity as 1 and the minimum intensity as 0 in the wavenumber domain of 200~1800 $cm^{-1}$, Raman intensity of the minimum (V band) between the two peaks of said peak $P_A$ and said peak $P_B$ is 0.6 or less, and Raman intensity of said peak $P_C$ is 0.1 or more and 0.5 or less.

8 Claims, 2 Drawing Sheets

5 μm

POSITIVE ELECTRODE AND LITHIUM ION SECONDARY BATTERY USING THEREOF

The present invention relates to a positive electrode and a lithium ion secondary battery using thereof.

BACKGROUND

Conventionally, layered compounds such as $LiCoO_2$, $LiNi_{1/3}Mn_{1/3}CO_{1/3}O_2$ and the like and spinel compounds such as $LiMn_2O_4$ and the like have been used as positive electrode materials (positive electrode active materials) of lithium ion secondary batteries. Even in the layered compounds, it is known that the compounds with high content of Ni such as $LiNiO_2$ and the like show high capacitance. However, the lithium ion secondary batteries using the compounds with high content of Ni such as $LiNiO_2$ and the like as described in Patent Document 1 or Patent Document 2 have a lower theoretical density compared with those using the compounds containing Co such as $LiCoO_2$ and the like, and as a result, there is a disadvantage such that the energy density as a battery becomes low.

Hence, there is a method to improve electrode density by compounding treatment of attaching the conductive auxiliary agent on the surface of the positive electrode active materials, as described in Patent Document 3.

However, the compounding treatment is preformed by applying pressure and shearing force while mixing the positive electrode active material and the conductive auxiliary agent. Thus, if the force is too high, the technical problem such as leading to deterioration of the conductive auxiliary agent, worsening the rate discharge characteristic will exist.

Further, hereinafter, the lithium ion secondary battery is recorded as the 'battery' according to the circumstances.

PATENT DOCUMENTS

Patent Document 1: JP2003-257434
Patent Document 2: JP2004-59417

SUMMARY

The present invention is achieved by recognizing the above-mentioned technical problem in the prior art. It is an object of the present invention to obtain a positive electrode with both a high electrode density and an excellent rate discharge characteristic and a lithium ion secondary battery using thereof.

To achieve the above purpose, the positive electrode according to the present invention is characterized in that it comprises a positive electrode active material and carbon adhered to the surface of the positive electrode active material, and said positive electrode active material is represented by the following formula (1). Further, in the Raman spectrum using an argon ion laser, said positive electrode includes a peak $P_A$ (D band) at 1200~1450 $cm^{-1}$, a peak $P_B$ (G band) at 1450~1700 $cm^{-1}$ and a peak $P_C$ at 400~600 $cm^{-1}$, and when the intensities are normalized by regarding the maximum intensity as 1 and regarding the minimum intensity as 0 in the wavenumber domain of 200~1800 $cm^{-1}$, Raman intensity of the minimum (V band) between the two peaks of said peak $P_A$ and said peak $P_B$ is 0.6 or less, and Raman intensity of said peak $P_C$ is 0.1 or more and 0.5 or less.

$$Li_a(Ni_xCO_yAl_{1-x-y})O_2 \qquad (1)$$

$(0.95 \leq a \leq 1.05,\ 0.5 \leq x \leq 0.9,\ 0.05 \leq y \leq 0.2)$

With such a structure, both a high electrode density and an excellent rate discharge characteristic can be realized.

The positive electrode according to the present invention is preferred that Raman intensity of the minimum (V band) between the two peaks of said peak $P_A$ and said peak $P_B$ is 0.33 or more and 0.37 or less. With such a structure, both a high electrode density and an excellent rate discharge characteristic can be realized in a higher level.

In addition, the lithium ion secondary battery according to the present invention is characterized in that a positive electrode, a negative electrode and electrolyte are contained in a container, and said positive electrode has the above-mentioned structure.

With such a structure, Both a high electrode density and an excellent rate discharge characteristic can be realized.

According to the positive electrode and the lithium ion secondary battery of the present invention, a high electrode density and an excellent rate discharge characteristic can be achieved.

DESCRIPTION OF REFERENCE NUMERALS

10 . . . positive electrode, 20 . . . negative electrode, 12 . . . positive electrode current collector, 14 . . . positive electrode active material layer, 18 . . . separator, 22 . . . negative electrode current collector, 24 . . . negative electrode active material layer, 30 . . . laminated body, 50 . . . container, 60,62 . . . lead, 100 . . . lithium ion secondary battery.

DETAILED DESCRIPTION OF EMBODIMENTS

Hereinafter, the preferred embodiments of the present invention are illustrated while making a reference to the drawings. Further, the present invention is not limited by the following embodiments. In addition, the constituent elements in the following embodiments and examples include those easily thought of by those skilled in the art and those substantially the same. Besides, the constituent elements disclosed in the following embodiments and examples can be appropriately combined.

A positive electrode according to the present embodiment is characterized in that it comprises a positive electrode active material and carbon adhered to the surface of the positive electrode active material, and said positive electrode active material is represented by the following formula (1). Further, in the Raman spectrum using an argon ion laser, said positive electrode includes a peak $P_A$ (D band) at 1200~1450 $cm^{-1}$, a peak $P_B$ (G band) at 1450~1700 $cm^{-1}$ and a peak $P_C$ at 400~600 $cm^{-1}$, and when the intensities are normalized by regarding the maximum intensity as 1 and regarding the minimum intensity as 0 in the wavenumber domain of 200~1800 $cm^{-1}$, Raman intensity of the minimum (V band) between the two peaks of said peak $P_A$ and said peak $P_B$ is 0.6 or less, and Raman intensity of said peak $P_C$ is 0.1 or more and 0.5 or less.

$$Li_a(Ni_xCo_yAl_{1-x-y})O_2 \quad (1)$$

($0.95 \leq a \leq 1.05$, $0.5 \leq x \leq 0.9$, $0.05 \leq y \leq 0.2$)

(Positive Electrode)

Figure 2:
FIG. 2 is a schematic cross-section drawing showing the structure of the positive electrode according to the present embodiment.

As shown in FIG. 2, a positive electrode 10 includes a plate-shaped (film-shaped) positive electrode current collector 12 and a positive electrode active material layer 14 formed on the positive electrode current collector 12.

(Positive Electrode Active Material Layer)

The positive electrode active material layer 14 is mainly composed of positive electrode active material, carbon as a conductive auxiliary agent and a binder.

(Positive Electrode Active Material)

The positive electrode active material is the compound represented by the following formula (1).

$$Li_a(Ni_xCo_yAl_{1-x-y})O_2 \quad (1)$$

($0.95 \leq a \leq 1.05$, $0.5 \leq x \leq 0.9$, $0.05 \leq y \leq 0.2$)

As for the positive electrode active material, from the viewpoint that capacity per unit weight is high, the compound with the composition represented by $Li_a(Ni_xCo_yAl_{1-x-y})O_2$ ($0.95 \leq a \leq 0.5 \leq x \leq 0.9$, $0.05 \leq y \leq 0.2$) is preferred to be used. Among them, the compound with the range of $0.77 \leq x \leq 0.87$ is more preferred because of good balance between capacity and rate discharge characteristics.

The used positive electrode active material can be primary particles or second particles, and it is preferably to be second particles. Further, in the case of second particles, the shape of the particles is more preferably spherical.

The average particle size of the aforesaid primary particles is preferably 0.3~5 μm, and the average particle size of the second particles is preferably 10~15 μm.

In addition, the determination method of the average particle size can be as follow: analyzing the electrode taken out from the battery, and using the observation image of a scanning electron microscope at the cross-section of the electrode, then calculating the average value of the particle size of about 50 particles selected by image analysis.

(Conductive Auxiliary Agent)

Examples of carbon as the conductive auxiliary agent include carbon blacks, graphites, carbon nano-tube (CNT), vapor grown carbon fibers (VGCF) and the like. Examples of graphites include acetylene black, oil furnace, ketjen black and the like. In addition, one or more carbon including carbon blacks, graphites, carbon nano-tube (CNT), vapor grown carbon fibers (VGCF) and the like are preferably contained.

The mixing ratio of the conductive auxiliary agent preferably ranges from 0.5 weight % to 3 weight % relative to the whole positive electrode. By being such mixing ratio, the electrode density and the rate discharge characteristic can be further improved.

The particles obtained by compounding the above-mentioned positive electrode active material by means of the conductive auxiliary agent are preferably produced by crushing carbon particles used as the conductive auxiliary agent and then attached on the surface of the positive electrode active material. In addition, when second particles are used as the positive electrode active material, the crushed carbon particles are preferably filled between primary particles of the positive electrode active material.

(Binder)

Polyvinylidene fluoride (PVDF), vinylidene fluoride-hexafluoropropylene based fluoro rubber (VDF-HFP based fluoro rubber), vinylidene fluoride-hexafluoropropylene-tetrafluoroethylene based fluoro rubber (VDF-HFP-TFE based fluoro rubber), aromatic polyamide, cellulose, styrene-butadiene rubber, isoprene rubber, butadiene rubber, ethylene-propylene rubber and the like can be used as the binder. Additionally, the thermoplastic elastomers such as styrene-butadiene-styrene block copolymer, hydrogenated products thereof, styrene-ethylene-butadiene-styrene copolymer, styrene-isoprene-styrene block copolymer, hydrogenated products thereof, and the like also can be used. Further, syndiotactic 1,2-polybutadiene, ethylene-vinyl acetate copolymer, propylene-α-olefin (the number of carbon atoms is from 2 to 12) copolymer and the like also can be applied. From the viewpoint of improving the electrode density, the specific gravity of the polymer used as the binder is higher than 1.2 g/cm$^3$. In addition, from the viewpoint of improving the electrode density and enhancing adhesion force, weight-average molecular weight is preferably 700 thousand or more.

The content of the binder contained in the positive electrode active material layer 14 is preferably 0.5 to 6 mass % on the basis of the weight of the active material layer. If the content of the binder is less than 0.5 mass %, the amount of the binder is too low to form the solid active material layer. In addition, if the content of the binder is more than 6 mass %, the amount of the binder without contribution to the capacitance becomes much, and thus it is difficult to achieve the sufficient volumetric energy density. Moreover, in this case, especially when electron conductivity of the binder is low, electric resistance of the active material layer increases so that the possibility that sufficient capacitance can not be obtained rises.

(Positive Electrode Current Collector)

The positive electrode current collector 12 can be made from conductive plate material. For example, metal sheet such as aluminium, copper and nickel foil can be used.

The positive electrode consists of the above construction material. In addition, in the Raman spectrum using an argon ion laser, the positive electrode includes a peak $P_A$ (D band) at 1200~1450 cm$^{-1}$, a peak $P_B$ (G band) at 1450~1700 cm$^{-1}$ and a peak $P_C$ at 400~600 cm$^{-1}$, and when the intensities are normalized by regarding the maximum intensity as 1 and regarding the minimum intensity as 0 in the wavenumber domain of 200~1800 cm$^{-1}$, the condition, that the Raman intensity of the minimum (V band) between the two peaks of the peak $P_A$ and the peak $P_B$ is 0.6 or less and the Raman intensity of the peak $P_C$ is 0.1 or more and 0.5 or less, is satisfied. Moreover, if the Raman intensity of the V band is 0.33 or more and 0.37 or less, excellent electrode density and rate discharge characteristic can be obtained, and thus it is preferable.

Further, the Raman spectrum using an argon ion laser can use Raman measurement device using known argon ion laser. For example, measurement can be performed by using argon ion laser with wavelength of 514.532 nm.

Based on the reason below, the lithium ion secondary battery with both a high electrode density and an excellent rate discharge characteristic can be obtained if the positive electrode 10 is used. If the standardized Raman intensity (the Raman intensity after standardization is recorded as the standardized Raman intensity below) of the minimum (V band) between the two peaks of the peak $P_A$ (D band) at 1200~1450 cm$^{-1}$ and the peak $P_B$ (G band) at 1450~1700 cm$^{-1}$ is 0.6 or less, it is considered that the conductive auxiliary agent is evenly attached to the surface of the positive electrode active material without deterioration of the conductive auxiliary agent during the compounding treatment between the positive electrode active material and the conductive auxiliary agent, and high density of the electrode is achieved, and thus, the structure with excellent electron conductivity between the active materials can be obtained, and good rate discharge characteristic of the battery can be achieved.

Besides, if the standardized Raman intensity of the peak $P_C$ at 400~600 cm$^{-1}$ is 0.1 or more and 0.5 or less, the content of the conductive auxiliary agent is proper and film with suitable thickness is attached to the surface of the positive electrode active material, and thus the structure with electron conductivity between the active materials improved can be obtained. With such structure, excellent rate discharge characteristic as the battery can be achieved.

Here, if the standardized Raman intensity of the above-mentioned V band is over 0.6, the possibility of deterioration of the conductive auxiliary agent becomes high.

In addition, it can be foreseen that if the standardized Raman intensity of the peak $P_C$ is less than 0.1, the layer of the conductive auxiliary agent attached to the surface of the positive electrode active material will inhibit the desorption of Li ions so that ion conductivity and charge and discharge properties deteriorate. It is considered that if it is more than 0.5, the attachment of the conductive auxiliary agent to the surface of the positive electrode active material becomes insufficient, condensates of the conductive auxiliary agent exist in the electrode and thus high electrode density can not be achieved.

The standardized Raman intensity of the minimum (V band) between the two peaks of the peak $P_A$ (D band) at 1200~1450 cm$^{-1}$ and the peak $P_B$ (G band) at 1450~1700 cm$^{-1}$ and the standardized Raman intensity of the peak $P_C$ at the wavenumber of 400~600 cm$^{-1}$ can be adjusted by shearing force during compounding treatment of the positive electrode active material and the conductive auxiliary agent. If the force becomes large, the standardized Raman intensity of the V band increases and the standardized Raman intensity of the peak $P_C$ reduces.

In order to adjust the V band to be 0.6 or less, the methods such as reducing revolution speed of the compounding device, reducing treatment time, increasing the input amount of the active material and the conductive auxiliary agent, set the compounding treatment device to reduce inclination and the like can be listed. These methods may be used alone or two or more may be used in combination.

In order to make the standardized Raman intensity of $P_C$ be 0.1 or more and 0.5 or less, the revolution speed or treatment time of the compounding device and input amount of the active material and the conductive auxiliary agent can be appropriately adjusted. These methods may be used alone or two or more may be used in combination.

Next, the structure of the lithium ion secondary battery containing the above-mentioned positive electrode is described.

(Lithium Ion Secondary Battery)

Figure 1:
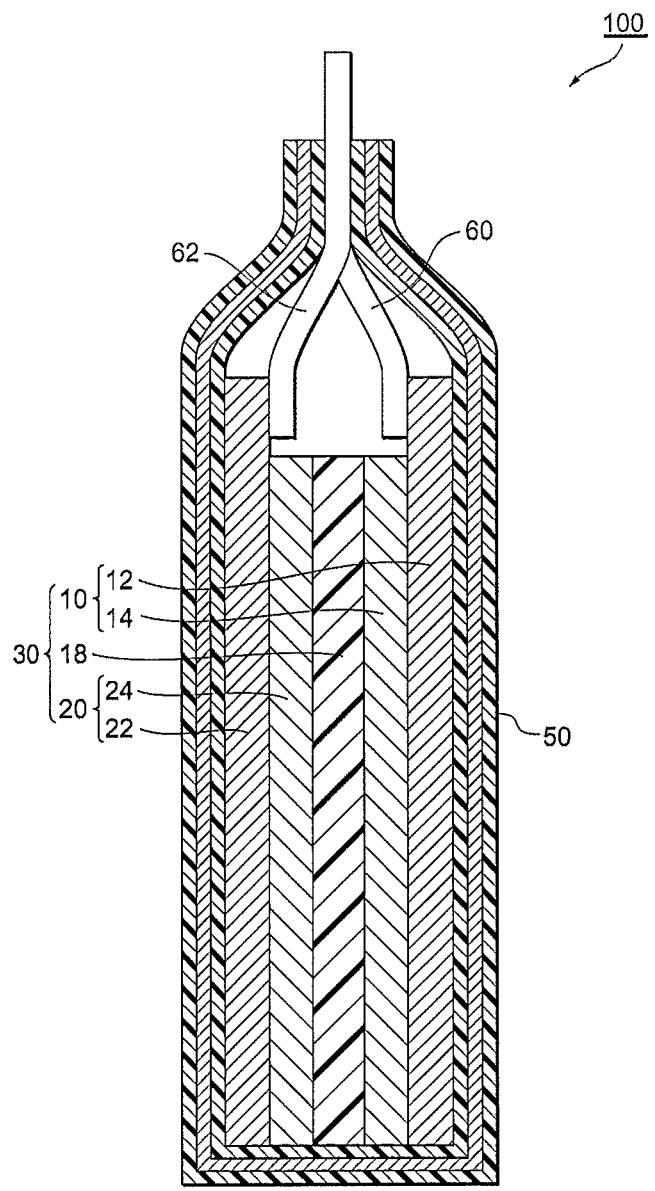
FIG. 1 is a schematic cross-section drawing showing the structure of the lithium ion secondary battery according to the present embodiment.

FIG. 1 shows the example of the structure of the lithium ion secondary battery in the present embodiment. A lithium ion secondary battery consists of a positive electrode able to absorb and emit lithium ion, a negative electrode and a separator. The positive electrode, the negative electrode and the separator are sealed in a container. The charge and discharge are performed in the condition impregnated with electrolytes. A lithium ion secondary battery 100 mainly includes a laminated body 30, a container 50 for housing the laminated body 30 in a sealed state, and a pair of leads 60 and 62 connected to the laminated body 30.

The laminated body 30 is formed by disposing a pair of a positive electrode 10 and a negative electrode 20 so as to face each other with a separator 18 interposed therebetween. The positive electrode 10 is formed by disposing a positive electrode active material layer 14 on a positive electrode current collector 12. The negative electrode 10 is formed by disposing a negative electrode active material layer 24 on a negative electrode current collector 22. In addition, the positive electrode active material layer 14 and the negative electrode active material layer 24 are in contact with two sides of the separator 18 respectively. Further, leads 60 and 62 are respectively connected to the ends of the positive electrode current collector 12 and the negative electrode current collector 22. Ends of the leads 60 and 62 extend to the outside of the container 50.

(Negative Electrode)

The negative electrode 20 includes the negative electrode current collector 22 and the negative electrode active material layer 24 formed on the negative electrode current collector 22. The same materials as those for the positive electrode can be used as the negative electrode current collector 22, the binder and the conductive auxiliary agent. Moreover, the negative electrode active material is not particularly limited and a known negative electrode active material for battery can be used. Examples of the negative electrode active material include a carbon material capable of absorbing and emitting (intercalating and deintercalating, or doping and dedoping) lithium ions, such as graphite, nongraphitizable carbon, graphitizable carbon, or low temperature heat-treated carbon; a metal capable of forming a composition with lithium, such as Al, Si, or Sn; an amorphous compound mainly containing an oxide, such as SiO, SiO$_2$ or SnO$_2$; a composition of silicon dioxide and silicon; particles including lithium titanate (Li$_4$Ti$_5$O$_{12}$) or the like. Among them, SiO with high acceptance of lithium ion from the positive electrode or the composition of silicon dioxide and silicon is preferably used from the viewpoint of improving the rate discharge characteristic.

(Electrolyte)

The electrolyte is impregnated inside the positive electrode active material layer 14, the negative electrode active material layer 24, and the separator 18. The electrolyte is not particularly limited; for example, in this embodiment, an electrolytic solution (aqueous electrolyte solution, electrolytic solution using an organic solvent) containing lithium salt can be used. However, since an electrolytic solution has a low decomposing voltage electrochemically, the withstanding voltage at the charging is restricted to be low. For this reason, it is preferably to be the electrolytic solution (non-aqueous electrolyte solution) using organic solvent. As the electrolytic solution, the solution in which lithium salt is dissolved in a non-aqueous solvent (organic solvent) is preferably used. Examples of the lithium salt include LiPF$_6$, LiClO$_4$, LiBF$_4$, LiAsF$_6$, LiCF$_3$SO$_3$, LiCF$_3$, CF$_2$SO$_3$, LiC(CF$_3$SO$_2$)$_3$, LiN(CF$_3$SO$_2$)$_2$, LiN(CF$_3$CF$_2$SO$_2$)$_2$, LiN(CF$_3$SO$_2$)(C$_4$F$_9$SO$_2$), LiN(CF$_3$CF$_2$CO)$_2$, LiBOB and the like. Further, these salts may be used alone or two or more kinds thereof may be used in combination.

In addition, the mixture of a cyclic carbonate and a chain carbonate can be used as the organic solvent. Examples of the cyclic carbonate include propylene carbonate, ethylene carbonate, fluoroethylene carbonate. Examples of the chain carbonate include diethyl carbonate, dimethyl carbonate, and methylethyl carbonate. These may be used alone or two or more kinds thereof may be mixed at an arbitrary ratio.

Further, in this embodiment, the gel-like electrolyte obtained by adding a gelling agent is also applicable instead of the electrolytic solution. Moreover, instead of the electrolytic solution, a solid electrolyte (a solid polyelectrolyte or a electrolyte consisting of ion-conductive inorganic materials) may be contained.

(Separator)

The separator 18 may be formed of an electrically insulating porous body. The separator 18 may be, for example, a single-layer body or a multilayer body of a film including polyethylene, polypropylene, or polyolefin, an extended film of a mixture of the above resin, or nonwoven fabric including at least one component material selected from the group consisting of cellulose, polyester, and polypropylene.

(Container)

The container 50 is to have the laminated body 30 and the electrolytic solution inside in a sealed state. The container 50 is not particularly limited as long as the leakage of the electrolytic solution to the outside and the intrusion of moisture and the like from the outside to the inside of the electrochemical device 100 can be suppressed. For example, a metal laminated film obtained by coating a metal foil with a polymer film on two sides as shown in FIG. 1 can be used as the container 50. The container 50 is also called as an exterior body. In addition, the lithium ion secondary battery with an excellent rate discharge characteristic can be obtained if the metal laminated film is used as the exterior body. Although its reason is not clear, the electrode expands or shrinks when the lithium ions are intercalated into the electrode. It is guessed that the metal laminated film follows with the expansion and shrinkage of the electrode without inhibition the move of the lithium ions, and thus the excellent rate discharge characteristic can be achieved. For example, an aluminum foil can be used as the metal foil, and a film of polypropylene or the like can be used as the polymer film. For example, as the material of the external polymer film, polymer with a high melting point such as polyethylene terephthalate (PET), polyamide or the like is preferable; as the material of the internal polymer film, polyethylene, polypropylene, or the like is preferable.

(Leads)

The leads 60 and 62 are formed of a conductive material such as aluminum or the like.

The production methods of the positive electrode and the lithium ion secondary battery of the present embodiment are described as follows.

(Production Method of Positive Electrode)

The production method of the positive electrode according to the present embodiment includes a compounding step, a slurry preparation step, an electrode coating step and a rolling step.

(Compounding Step)

Firstly, in the compounding step, the positive electrode active material and the conductive auxiliary agent are mixed while the shear force is applied. The density of the composite particles is improved without the deterioration of the conductive auxiliary agent while the conductive auxiliary agent is evenly attached to the surface of the positive electrode active material.

(Slurry Preparation Step)

Next, the binder and the solvent are mixed into the composite particles consisting of the positive electrode active material and the conductive auxiliary agent to prepare slurry. The kind of solvent depends on the binder. For example, when PVDF is used as the binder, the solvent such as N-methyl-2-pyrrolidone, N,N-dimethylformamide or the like can be applied.

(Electrode Coating Step)

The known method such as doctor blade, slot-die, nozzle, gravure roll and the like can be appropriately selected to coating the slurry. The loading amount of the positive electrode can be adjusted by adjustment of the coating amount or line speed. After coating slurry, it is dried so as to make solvent evaporate.

(Rolling Step)

Finally, the positive electrode is obtained by rolled in the presence of roll pressure. At the same time, the roller is heated to soften the binder, and thus the higher electrode density can be achieved. The temperature of the roller preferably ranges from 100° C. to 200° C.

(Production Method of Negative Electrode)

On the other hand, the negative electrode can be produced by a slurry preparation step, an electrode coating step and a rolling step except the above-mentioned compounding step. Further, each step can be performed on the same condition as that of the production method of the positive electrode.

At the state of the separator interposed between the positive electrode and the negative electrode prepared as above, they together with electrolytic solution are put into the container 50. Then, the entrance of the container 50 is sealed to complete the lithium ion secondary battery.

Further, the leads 60 and 62 are respectively welded to connect with the positive electrode current collector 12 and the negative electrode current collector 22 to complete the lithium ion secondary battery as shown in FIG. 1.

EXAMPLES

Hereinafter, Examples and Comparative examples are used to describe the present invention in detail. However, the present invention is not limited to the following Examples.

Examples 1

Figure 3:
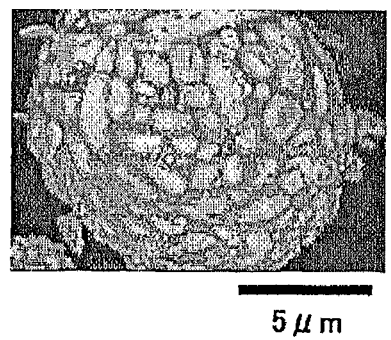
FIG. 3 is an observation image of a positive electrode active material after compounding treatment in Example 1 achieved by means of a scanning electron microscope.

Manufacture of a Cell for Evaluation $Li_{1.03}(Ni_{0.85}Co_{0.1}Al_{0.05})O_2$ was applied as the positive electrode active material, and Mechanofusion produced by Hosokawa Micron Ltd. was adopted to make acetylene black used as the conductive auxiliary agent with slant of an angle of 10°. Compounding (the compounding step) was conducted on the condition of revolution speed of 3100 rpm. FIG. 3 shows an image of a positive electrode active material after compounding in the compounding step by means of a scanning electron microscope (SEM). As a result, it was confirm that the conductive auxiliary agent was evenly coated around the positive electrode active material. In addition, it was confirmed that the composite particles were ones in which carbon particles used as the conductive auxiliary agent were crushed and attached to the surface of the positive electrode active material, and the crushed conductive auxiliary agent was filled between the primary particles that constituted second particles.

Subsequently, polyvinylidene fluoride (PVdF) was added into the positive electrode active material after the compounding step, and mixed with the weight ratio of $Li_{1.03}(Ni_{0.85}Co_{0.1}Al_{0.05})O_2$ to acetylene black to PVdF being 97:1:2. Next, the solvent N-methyl-2-pyrrolidone (NMP) was added to prepare slurry, and then thickening was conducted for 1 hr. Thereafter, NMP was added to adjust viscosity to be 5000 mPa·s. The slurry was coated on the aluminum foil, i.e., the current collector, by means of doctor blade method, and then dried for 10 min at the temperature of 100 □. And then, rolling was conducted at line pressure of 2 tcm$^{-1}$ by means of a roller heated to 100 □ to produce the positive electrode. The loading amount of the active material in the positive electrode was adjusted to be 22 mg/cm$^2$.

Subsequently, the slurry-shaped coating for a negative electrode was prepared by a method in which composite of silicon dioxide and silicon, acetylene black and N-methyl-2-pyrrolidone (NMP) solution of polyimide resin was mixed with the weight ratio of composite of silicon dioxide and silicon to acetylene black to polyimide resin being 70:10:20. This coating was applied onto the copper foil, i.e., the current collector, and dried and rolled, thereby providing the negative electrode.

The separator made up of the polyethylene porous film was interposed between the positive electrode and the negative electrode, and then stacked to obtain the laminated body (battery element). The laminated body was put into an aluminum laminated package used as the exterior body (which was laminated bag body obtained by coating polypropylene (PP) and polyethylene terephthalate (PET) on the two principal surfaces of the aluminum foil).

The electrolytic solution was obtained by mixing ethylene carbonate (EC) and diethyl carbonate (DEC) with the volume ratio of 3:7 to make the content of LiPF$_6$ as the lithium salt being 1.5 mol/L. The electrolytic solution prepared as above was filled into the aluminum laminated package containing the laminated body. Then, the aluminum laminated package was sealed to vacuum. Thus, the cell for evaluation of Example 1 was completed.

Example 2

A cell for evaluation was produced as in Example 1 except that the revolution speed of Mechanofusion was changed into 3500 rpm.

Example 3

A cell for evaluation was produced as in Example 1 except that the revolution speed of Mechanofusion was changed into 3900 rpm.

Example 4

A cell for evaluation was produced as in Example 1 except that the revolution speed of Mechanofusion was changed into 1900 rpm.

Example 5

A cell for evaluation was produced as in Example 1 except that the revolution speed of Mechanofusion was changed into 1700 rpm.

Example 6

A cell for evaluation was produced as in Example 1 except that the composition ratio of the electrode was changed to be the weight ratio of $Li_{1.03}(Ni_{0.85}Co_{0.1}Al_{0.05})O_2$ to carbon black to PVdF being 95:3:2.

Example 7

A cell for evaluation was produced as in Example 6 except that the revolution speed of Mechanofusion was changed into 2500 rpm.

Example 8

A cell for evaluation was produced as in Example 6 except that the revolution speed of Mechanofusion was changed into 2800 rpm.

Example 9

A cell for evaluation was produced as in Example 1 except that $Li_{1.05}(Ni_{0.87}Co_{0.08}Al_{0.05})O_2$ was used as the positive electrode active material.

Example 10

A cell for evaluation was produced as in Example 1 except that $Li_{1.05}(Ni_{0.77}Co_{0.14}Al_{0.09})O_2$ was used as the positive electrode active material.

Example 11

A cell for evaluation was produced as in Example 1 except that $Li_{0.95}(Ni_{0.9}Co_{0.05}Al_{0.05})O_2$ was used as the positive electrode active material.

Example 12

A cell for evaluation was produced as in Example 1 except that $Li_{1.03}(Ni_{0.5}Co_{0.2}Al_{0.3})O_2$ was used as the positive electrode active material.

Example 13

A cell for evaluation was produced as in Example 1 except that mixing was performed with the weight ratio of the positive electrode active material to the conductive auxiliary agent to the binder being $Li_{1.03}(Ni_{0.85}Co_{0.1}Al_{0.05})O_2$:acetylene black:PVdF=97:2.5:0.5.

Example 14

A cell for evaluation was produced as in Example 1 except that mixing was performed with the weight ratio of the positive electrode active material to the conductive auxiliary agent to the binder being $Li_{1.03}(Ni_{0.85}Co_{0.1}Al_{0.05})O_2$:acetylene black:PVdF=97:2:3.

Example 15

A cell for evaluation was produced as in Example 1 except that mixing was performed with the weight ratio of the positive electrode active material to the conductive auxiliary agent to the binder being $Li_{1.03}(Ni_{0.85}Co_{0.1}Al_{0.05})O_2$:acetylene black:PVdF=97.5:0.5:2.

Comparative Example 1

A cell for evaluation was produced as in Example 1 except that the revolution speed of Mechanofusion was changed into 4200 rpm.

Comparative Example 2

A cell for evaluation was produced as in Example 1 except that the revolution speed of Mechanofusion was changed into 4800 rpm.

Comparative Example 3

A cell for evaluation was produced as in Example 1 except that the revolution speed of Mechanofusion was changed into 1500 rpm.

Comparative Example 4

A cell for evaluation was produced as in Example 1 except that the revolution speed of Mechanofusion was changed into 4500 rpm.

Comparative Example 5

A cell for evaluation was produced as in Example 1 except that the revolution speed of Mechanofusion was changed into 5000 rpm.

Comparative Example 6

A cell for evaluation was produced as in Example 1 except that the revolution speed of Mechanofusion was changed into 1400 rpm.

Comparative Example 7

A cell for evaluation was produced as in Example 1 except that $Li_{1.03}(Ni_{0.48}Co_{0.47}Al_{0.05})O_2$ was used as the positive electrode active material.

Comparative Example 8

A cell for evaluation was produced as in Example 1 except that $Li_{1.03}(Ni_{0.46}Co_{0.47}Al_{0.07})O_2$ was used as the positive electrode active material.

Comparative Example 9

A cell for evaluation was produced as in Example 1 except that $Li_{1.03}(Ni_{0.70}Co_{0.25}Al_{0.05})O_2$ was used as the positive electrode active material.

Comparative Example 10

A cell for evaluation was produced as in Example 1 except that $Li_{1.03}(Ni_{0.65}Co_{0.30}Al_{0.05})O_2$ was used as the positive electrode active material.

Comparative Example 11

A cell for evaluation was produced as in Example 1 except that dry mixing of the positive electrode active material and the conductive auxiliary agent was conducted by means of a beads mill instead of the compounding step. Further, the beads mill in which the material of the beads was $Al_2O_3$ and the diameter of the beads was 3 mmΦ was adopted. In addition, the revolution speed of the agitator was 3 m/sec.

(Evaluation for the Rate Discharge Characteristic)

The rate discharge characteristic (unit: %) of the lithium ion secondary battery of Example 1 was calculated. Further, the rate discharge characteristic means the ratio of the discharge capacity at 1 C in the case where the discharge capacity at 0.1 C was regarded as 100%. The results how to maintain the discharge characteristic from low rate to high rate were shown in Table 1. The higher rate discharge characteristic is the better it is. The case that the rate discharge characteristic was 75% or more was judge as favorable one.

(Evaluation for the Electrode Density)

The electrode density was calculated according to the weight of the electrode and the area and thickness of the coating film. The obtained results were shown in Table 1. The larger electrode density, more preferable it is. The case that the electrode density was 3.90 (unit: g/cm³) or more was judge as favorable one.

(Evaluation for Raman Scattering Intensity)

Argon laser Raman device produced by HORIBA Jobin Yvon Company was adopted, and the argon ion laser with the wavelength of 514.532 nm was used to measure the Raman spectrum of the positive electrode.

It could be known from the results shown in Table 1 that when the standardized minimum Raman scattering intensity between the two peaks at the wavenumber of the positive electrode of 1200~1700 cm⁻¹ was 0.6 or less, and the standardized maximum Raman scattering intensity between the wavenumber of 400~600 cm⁻¹ was 0.1 or more and 0.5 or less, the excellent discharge characteristics were shown even on the condition of high rate, and high electrode density could be achieved.

TABLE 1

|  |  | Raman intensity of $P_C$ | Minimum Raman intensity between $P_A$ and $P_B$ | Electrode density | Rate property (1 C/0.1 C) |
|---|---|---|---|---|---|
| Examples | 1 | 0.46 | 0.38 | 4.05 | 84% |
|  | 2 | 0.26 | 0.57 | 4.08 | 80% |
|  | 3 | 0.10 | 0.60 | 4.10 | 76% |
|  | 4 | 0.49 | 0.37 | 3.94 | 87% |
|  | 5 | 0.50 | 0.34 | 3.90 | 88% |
|  | 6 | 0.40 | 0.37 | 3.95 | 86% |
|  | 7 | 0.47 | 0.36 | 3.90 | 88% |
|  | 8 | 0.43 | 0.39 | 4.01 | 84% |
|  | 9 | 0.46 | 0.38 | 4.05 | 84% |
|  | 10 | 0.46 | 0.38 | 4.04 | 84% |
|  | 11 | 0.46 | 0.38 | 4.04 | 84% |
|  | 12 | 0.46 | 0.38 | 4.05 | 84% |
|  | 13 | 0.42 | 0.40 | 4.07 | 84% |
|  | 14 | 0.45 | 0.36 | 3.90 | 88% |
|  | 15 | 0.35 | 0.33 | 4.08 | 87% |
| Comparative Examples | 1 | 0.08 | 0.62 | 4.11 | 68% |
|  | 2 | 0.07 | 0.64 | 4.13 | 66% |
|  | 3 | 0.52 | 0.30 | 3.85 | 69% |
|  | 4 | 0.07 | 0.63 | 4.12 | 67% |
|  | 5 | 0.06 | 0.62 | 4.14 | 62% |
|  | 6 | 0.54 | 0.28 | 3.82 | 68% |
|  | 7 | 0.46 | 0.38 | 4.04 | 70% |
|  | 8 | 0.46 | 0.38 | 4.05 | 68% |
|  | 9 | 0.46 | 0.38 | 4.04 | 73% |
|  | 10 | 0.46 | 0.38 | 4.05 | 72% |
|  | 11 | 0.54 | 0.32 | 3.75 | 65% |

What is claimed is:

1. A positive electrode comprising,
a positive electrode active material and carbon adhered to the surface of said positive electrode active material,
wherein, said positive electrode active material is represented by the following formula (1), $$Li_a(Ni_xCo_yAl_{1-x-y})O_2 \qquad (1)$$

wherein, $0.95 \leq a \leq 1.05$, $0.5 \leq x \leq 0.9$, $0.05 \leq y \leq 0.2$,
in the Raman spectrum using an argon ion laser, said positive electrode includes a peak $P_A$ (D band) at about 1200-1450 cm⁻¹, a peak $P_B$ (G band) at about 1450-1700 cm⁻¹ and a peak $P_C$ at about 400-600 cm⁻¹, and when the intensities are normalized by regarding the maximum intensity as 1 and regarding the minimum intensity as 0 in the wavenumber domain of about 200-1800 cm$^{-1}$, Raman intensity of the minimum (V band) between the two peaks of said peak $P_A$ and said peak $P_B$ is 0.33 or more and 0.6 or less, and Raman intensity of said peak $P_C$ is 0.1 or more and 0.5 or less.

2. The positive electrode according to claim 1, wherein, Raman intensity of the minimum (V band) between the two peaks of said peak $P_A$ and said peak $P_B$ is 0.33 or more and 0.37 or less.

3. A lithium ion secondary battery, wherein, a positive electrode, a negative electrode and electrolyte are contained in a container, said positive electrode is the positive electrode according to claim 1.

4. The lithium ion secondary battery according to claim 3, which has a rate discharge characteristic in a range of from 75% to 88%.

5. The positive electrode according to claim 1, wherein, $0.77 \leq x \leq 0.87$.

6. The positive electrode according to claim 1, wherein, the carbon is present in an amount of from 0.5 to 3% by weight relative to the positive electrode.

7. The positive electrode according to claim 1, which has an electrode density in a range of from 3.90 g/cm$^3$ to 4.10 g/cm$^3$.

8. The positive electrode according to claim 1, wherein the positive electrode active material and the carbon are compounded such that the carbon is evenly attached to the surface of the positive electrode active material.

* * * * *